US012609603B2

(12) United States Patent (10) Patent No.: US 12,609,603 B2

Chen et al. (45) Date of Patent: Apr. 21, 2026

(54) METHOD OF CONTROLLING PHASE SHIFT PULSE WIDTH MODULATION OF POWER CONVERTER

(71) Applicant: PHIHONG TECHNOLOGY CO., LTD., Taoyuan City (TW)

(72) Inventors: Chun-Chen Chen, Taoyuan City (TW); Jian-Hsieng Lee, Taoyuan City (TW); Feng-Yi Lin, Taoyuan City (TW)

(73) Assignee: PHIHONG TECHNOLOGY CO., LTD., Taoyuan City (TW)

( * ) Notice: Subject to any disclaimer, the term of this patent is extended or adjusted under 35 U.S.C. 154(b) by 527 days.

(21) Appl. No.: 17/993,976

(22) Filed: Nov. 24, 2022

(65) Prior Publication Data

US 2024/0146176 A1 May 2, 2024

(30) Foreign Application Priority Data

Oct. 27, 2022 (TW) ................................. 111140952

(51) Int. Cl.
| | |
|---|---|
| *H02M 3/335* | (2006.01) |
| *H02M 1/00* | (2006.01) |
| *H02M 1/08* | (2006.01) |
| *H02M 3/00* | (2006.01) |

(52) U.S. Cl.
CPC ........... *H02M 1/08* (2013.01); *H02M 1/0058* (2021.05); *H02M 3/01* (2021.05); *H02M 3/33573* (2021.05)

(58) Field of Classification Search
CPC ......... H02M 3/33573; H02M 3/33576; H02M 3/33584; H02M 3/33592; H02M 3/337; H02M 3/3372; H02M 3/01; H02M 3/015; H02M 1/08; H02M 1/0058; H02M 1/082
See application file for complete search history.

(56) References Cited

U.S. PATENT DOCUMENTS

| | | | |
|---|---|---|---|
| 2014/0160807 A1* | 6/2014 | Han ........................ | H05B 45/39 |
| | | | 363/21.02 |
| 2020/0295666 A1* | 9/2020 | Chung .............. | H02M 3/33523 |
| 2023/0017092 A1* | 1/2023 | Fox .......................... | H02H 3/05 |

* cited by examiner

*Primary Examiner* — Nguyen Tran
(74) *Attorney, Agent, or Firm* — Chih Feng Yeh; Yongjean Consulting Inc.

(57) ABSTRACT

A method of controlling phase shift pulse width modulation of a power converter, the method includes a step of obtaining sampling signals of an output voltage and current of the power converter. Then, a digital signal processor is used to calculate an output power of the power converter. Next, a comparator is used to compare the output power of the power converter with a reference power. When the output power is less than the reference power, the modulation control of the switch of the power converter enters into hard-switching mode, and when the output power is greater than the reference power, the modulation control of the switch of the power converter enters into soft-switching mode.

20 Claims, 8 Drawing Sheets

Obtaining sampling signals of output voltage and current 201

Obtaining output power by a digital signal processor 203

Comparing output power with reference power 205

If output power is less than reference power, modulation control of switching element of power converter enters hard switching mode; otherwise, it enters soft switching mode 207

METHOD OF CONTROLLING PHASE SHIFT PULSE WIDTH MODULATION OF POWER CONVERTER

CROSS-REFERENCE STATEMENT

The present application is based on, and claims priority from, TAIWAN Patent Application Serial Number 111140952, filed Oct. 27, 2022, the disclosure of which is hereby incorporated by reference herein in its entirety.

TECHNICAL FIELD

The present invention relates to a power converter, and more particularly, a method of controlling phase shift pulse width modulation of a power converter.

BACKGROUND

For the power electronic products, with the trend of designing small, short, thin, and light electronic products, the switching frequency is continually increased in order to effectively reduce volume and weight of the switching power converter. However, the power switch components of the power converter withstand higher switching stresses and also produce more switching losses, once the switching frequency is increased, thus reducing the conversion efficiency of the switching power converter.

Because the conventional switching power converter is operated by the hard switching technology, the switching losses of the power switch components are also with increased if the switching frequency is increased. Therefore, the switching losses would reduce the conversion efficiency and shorten the use life of the switch components. The soft switching is generally divided into two categories: zero voltage switching (ZVS) and zero current switching (ZCS). ZVS technology means that the voltage difference across two terminals of the power switch component is decreased to zero during the transient period and then the power switch component is turned on.

The phase shift full bridge (PSFB) converter enables the switch of the circuit to achieve zero voltage switching through the phase shift control of the switch driving signal, so that the power consumed by the PSFB converter during switching can be minimized.

In addition, when the traditional PSFB power converter is under light load, due to the insufficient energy storage of the resonant inductor, it is difficult for the switching of the switch of the trailing arm to enter zero voltage switching when it is turned off, resulting in poor efficiency of light load of the power converter. The traditional solution is to increase the inductance of the resonant inductor, thereby increasing the energy that can be stored by the resonant inductor, and increasing the range of zero voltage switching of the trailing arm. However, the increase of resonant inductance will cause the increase of duty cycle loss and the increase of volume and cost of circuit. In order to solve this problem, the present invention proposes a novel control method for phase shift pulse width modulation.

SUMMARY

Based on the above rationales, the power converter of the present invention does not need to increase the resonant inductance when operating in light load, so it does not need to increase the volume of circuit, which can save costs and will not increase the loss of the duty cycle.

The modulation control method of the power converter of the present invention adopts different pulse modulation controlling to maintain high efficiency performance of the power converter in light load or heavy load.

In the present invention, the control method of modulation is changed according to the weight of the load, so that the power converter can obtain good efficiency performance regardless of light load or heavy load.

According to one aspect of the present invention, a method of controlling phase shift pulse width modulation of a power converter is disclosed, comprising obtaining output sampling signals of a power converter; obtaining an output power of the power converter operated by a digital signal processor; comparing the output power of the power converter with a reference power by a comparator; if the output power is less than the reference power, modulation control of switching element of the power converter enters a hard switching mode; and if the output power is greater than the reference power, modulation control of switching element of the power converter enters a soft switching mode.

According to another aspect of the present invention, the method further comprises using a switching controller to operate the hard switching mode and the soft switching mode, using a controller to calculate a duty cycle parameter according to a difference value outputted by the comparator and using a modulator component to generate a pulse control signal and a phase shift modulation signal for driving and controlling the power converter.

According to another aspect of the present invention, the modulator component includes a pulse width modulation signal generator and a phase shift modulation signal generator. The reference power is set by a reference power setting device. The power converter is a full-bridge resonant converter.

According to yet another aspect of the present invention, a method of controlling phase shift pulse width modulation of a power converter is disclosed, comprising determining whether a sampled signal of a power converter reaches a target value by a load state detector; obtaining an output power of the power converter operated by a digital signal processor; comparing the output power of the power converter with a reference power by a comparator to determine whether the output power is greater than the reference power, if the output power is greater than the reference power, the power converter outputs power by a soft switching mode; and comparing the output power of the power converter with the reference power by the comparator to determine whether the output power is less than the reference power, if the output power is less than the reference power, the power converter outputs power by a hard switching mode.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As mentioned in the above-mentioned, when the traditional phase shift full bridge (PSFB) power converter is under light load, due to the insufficient energy storage of the resonant inductor, it is difficult for the switching of the switch of the trailing arm to enter zero voltage switching when it is turned off, resulting in poor efficiency of light load of the power converter. Therefore, the present invention proposes a novel method of controlling phase shift pulse width modulation of a power converter. This controlling method can achieve good efficiency for the power converter, no matter under light load or heavy load. Compared with the conventional controlling method of full bridge phase shift modulation, the present invention can obtain better performance efficiency under light load. When the power converter of the present invention operates under light load, it is not necessary to increase the resonant inductance, so it is not necessary to increase the volume of circuit, which can save the cost and not increase the loss of the duty cycle.

Figure 1:
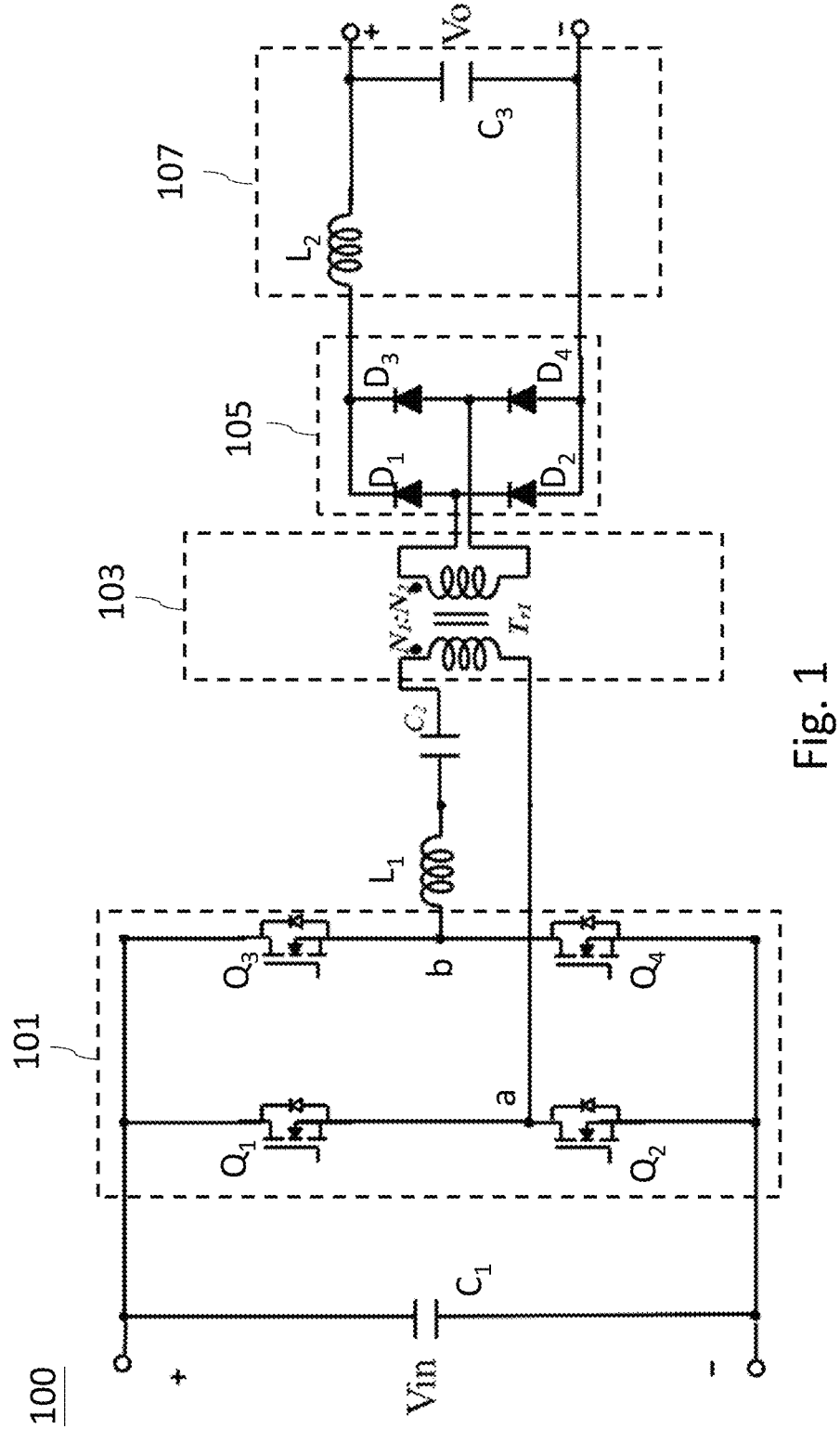
FIG. 1 illustrates a schematic diagram of a resonant converter.

FIG. 1 is a schematic circuit diagram of an existing resonant converter 100, which adopts a full-bridge resonant converter. The resonant converter is used to convert the direct circuit (DC) input voltage $V_{in}$ into the DC output voltage $V_o$ for supplying to the load. The resonant converter 100 includes a full-bridge switching circuit 101, a transformer 103, a rectifying circuit 105 and a filtering circuit 107. The full-bridge switching circuit 101 is used to control the input of the DC voltage $V_{in}$, which includes four switching devices $Q_1$, $Q_2$, $Q_3$, and $Q_4$ coupled to be driven by a driving element (not shown) for turning on and turning off. $Q_1$ and $Q_2$ are change-over switches of the leading arm, and $Q_3$ and $Q_4$ are change-over switches of the trailing arm. The resonant tank of the full-bridge resonant converter includes a resonant inductor $L_1$ and an output power capacitor (Coss) of $Q_1$ to $Q_4$. The transformer 103 includes a magnetic core, a primary side winding $N_1$, and a secondary side winding $N_2$, which is rectified and filtered by the rectifying circuit 105 and the filtering circuit 107. The rectifying circuit 105 includes $D_1$, $D_2$ rectifier diodes and $D_3$, $D_4$ rectifier diodes connected in series respectively. The filtering circuit 107 includes an inductor $L_2$ and an output capacitor $C_3$. The switching circuit 101 includes switches of any form, such as switching elements, transistor switches, or relays.

During the operation of the resonant converter 100, the output nodes a and b (i.e., output node a of the switch of the leading arm and output node b of the switch of the trailing arm) of the full-bridge switching circuit 101 are turned ON or OFF repeatedly due to the periodic switching of the switches to generate a periodically changing switching signal. The primary winding $N_1$ of the transformer 103 is connected in series with the resonant inductor $L_1$ and the capacitor $C_2$. When the signal is fed to the resonant tank, the direct current is isolated by the capacitor $C_2$ to prevent the transformer 103 from saturation. The current of the primary side the transformer 103 is not sinusoidal variation, and the secondary side windings $N_2$ of the transformer 103 continue to generate periodically varying current, which are rectified and filtered by the rectifying circuit 105 and the filtering circuit 107 to convert the periodically varying current into output DC current for providing DC output voltage $V_o$ to the load.

Figure 2:
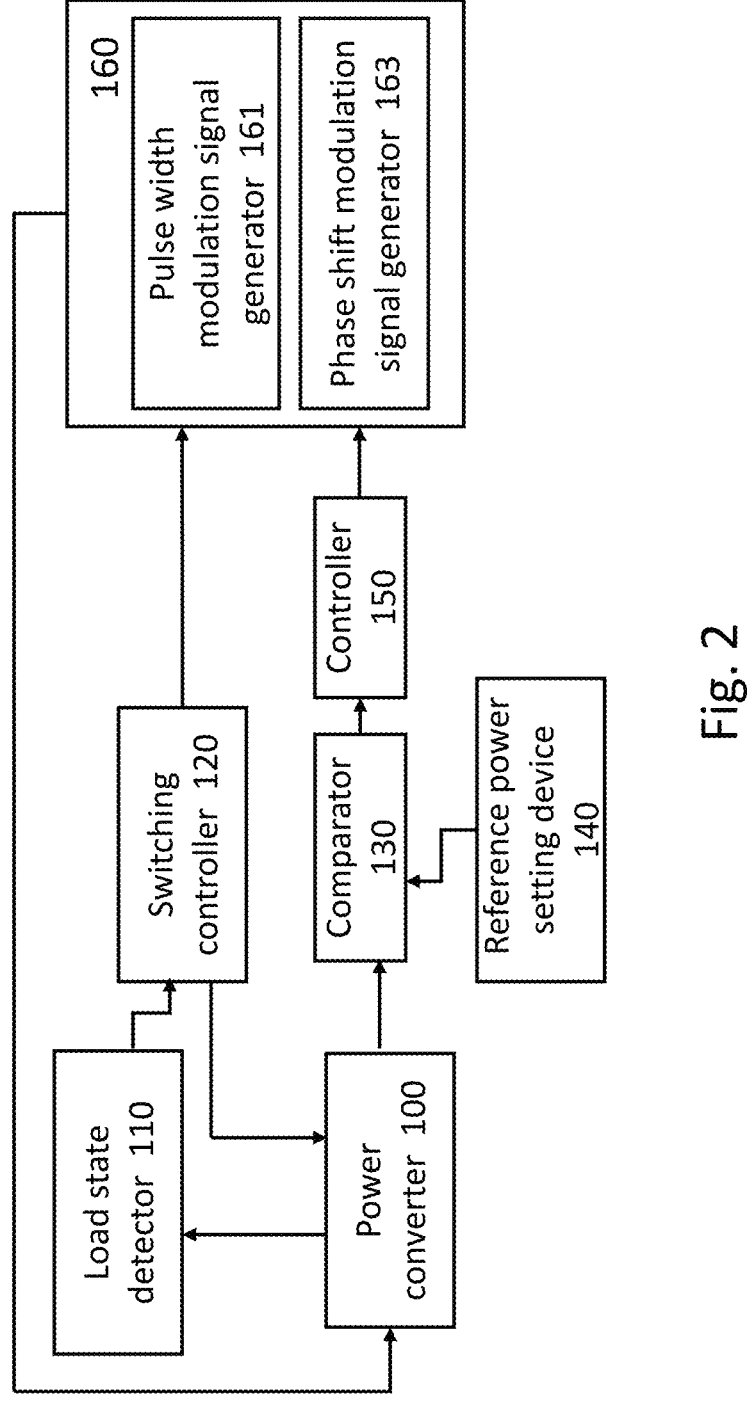
FIG. 2 illustrates the architecture and circuit diagram of the full bridge power conversion system of the present invention.

FIG. 2 shows the architecture and circuit diagram of the full bridge power conversion system of the present invention, including a power converter 100, a load state detector 110, a switching controller 120, a comparator 130, a reference power setting device 140, a controller 150, and a modulator component 160. The power converter 100 is responsible for converting an input voltage into an output voltage. The load state detector 110 is coupled to the power converter 100 to convert the parameters (e.g., output current, switching element current, inductance current, output voltage, output power, duty cycle, etc.) output by the power converter 100 into a load parameter data and transmit it to the switching controller 120. In one example, the load state detector 110 may use a feedback circuit having a dependency with the load parameter data as the front-end input circuit. The load state detector 110 may be constructed by circuit design according to the parameters output by the power converter 100 so as to output a load parameter data for the switching controller 120 to judge the parameter data of the load state. For example, the load state detector 110 includes a digital signal processor, and the detected load parameter data is the output power. The switching controller 120 can determine the load state of the power converter 100 according to the output power, so as to switch the operation mode of the power converter 100. The switching controller 120 is coupled to the power converter 100, the load state detector 110 and the modulator component 160. The switching controller 120 can judge the load state by the load parameter data, and control the switching elements to make the power converter 100 change its switching mode (hard switching, soft switching). For example, the modulator component 160 is coupled to the driving element of the four switching elements of the power converter 100 through a switching element. For example, the switching controller 120 is composed of a control circuit such as an analog controller or a digital controller.

As shown in FIG. 2, the comparator 130 is coupled to the power converter 100 and the reference power setting device 140. The output power of the power converter 100 is transmitted to the comparator 130, and the reference power setting device 140 also transmits an output reference power to the comparator 130. The comparator 130 then compares the output power of the power converter 100 with the output reference power to obtain a difference value of power. The controller 150 is coupled to the comparator 130 and the modulator component 160. The duty cycle (which is the duty cycle of the voltage between points a and b in FIG. 1) parameter can be calculated by the controller 150 according to the difference value output from the comparator 130, and supplies it to the modulator component 160 to generate a pulse control signal and a phase shift modulation signal for driving control of the power converter. For example, the controller 150 may be composed of a control circuit such as an analog controller or a digital controller. In one embodiment, the modulator component (module) 160 includes a pulse width modulation signal generator 161 and a phase shift modulation signal generator 163. The modulator component 160 is responsible for generating two kinds of modulation signals, the pulse width modulation signal and the phase shift modulation signal, and then inputting them into the driving element(s) of the four switching elements of the power converter 100 to control the on and off of the four switching elements. For example, the modulator component 160 may be composed of an analog circuit or a digital circuit that can generate pulse width and phase shift control signals. The controller 150 may be a microprocessor (MCU), a digital signal processor (DSP), an operation processing device having similar function(s).

Figure 3:
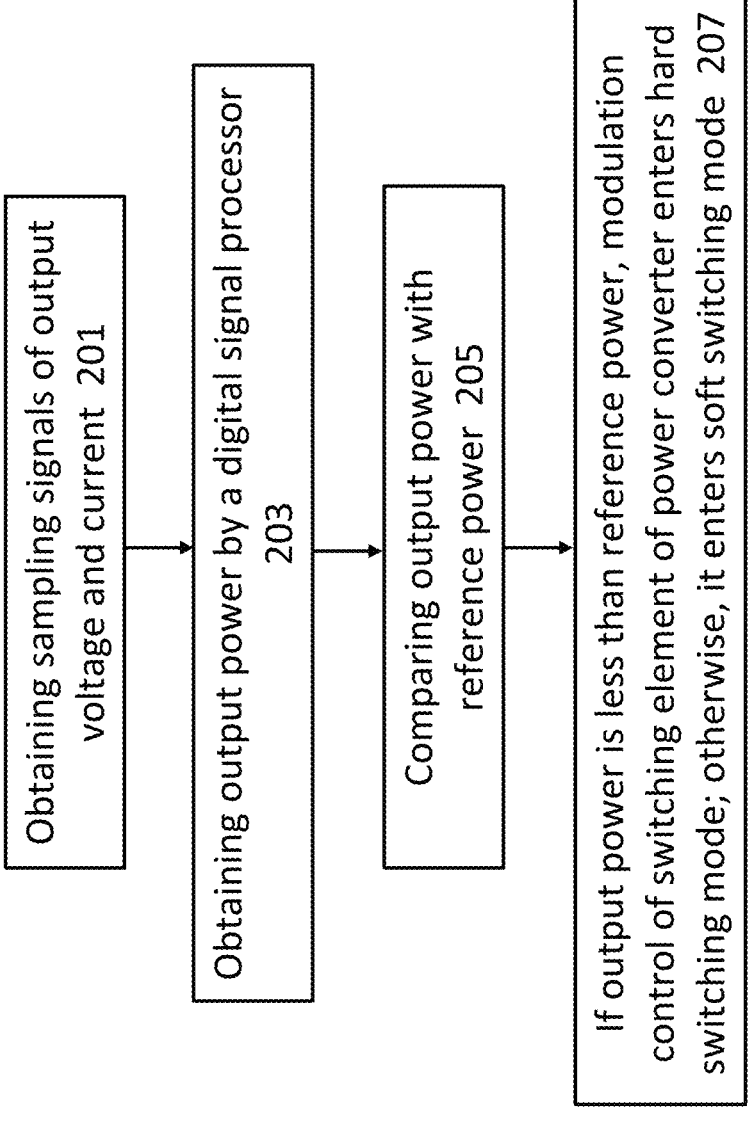
FIG. 3 illustrates a schematic diagram showing the flow of a method of controlling phase shift pulse width modulation of a power converter of the present invention.

FIG. 3 is a schematic diagram showing the flow of a method of controlling phase shift pulse width modulation of a power converter of the present invention. This method can be implemented through the full bridge power conversion system of FIG. 2, including the following steps. First, in the step 201, the sampling signals of output voltage and current of the power converter are obtained. In one embodiment, the sampling of the output voltage and current can be acquired through a sample and hold circuit (not shown). For example, the sample and hold circuit includes two sets of transmission gates, resistors, and capacitors. The transmission gate can sample the input voltage according to the sampling control voltage and the inverted sampling control voltage to generate the sampling enable voltage. The resistor includes a first terminal coupled to the transmission gate and a second terminal for outputting a sampling enable voltage. The capacitor includes a first end coupled to the second terminal of the resistor, and a second end coupled to the reference end.

Then, in the step 203, a digital signal processor is used to obtain the output power of the power converter. For example, this step may be implemented by the digital signal processor of the load state detector 110 in FIG. 2. Subsequently, in the step 205, the output power is compared with the reference power. In one embodiment, by setting an output reference power through the reference power setting device 140 in FIG. 2 and detecting the output power of the power converter by the load state detector 110, the comparator 130 can compare the output power of the power converter and the reference power to generate a difference value. Finally, the step 207 is executed. If the output power is less than the reference power, the modulation control of the switching element of the power converter enters the hard switching mode; otherwise, it enters the soft switching mode. In the step 207, according to an embodiment, the controller 150 in FIG. 2 calculates the duty cycle parameter for the modulator component 160 according to the difference value output by the comparator 130, and generates a pulse control signal for driving control, so as to control the on and off of the four switching elements to perform the hard switching mode or the soft switching mode. That is, if the output power calculated by the comparator 130 is less than the reference power (light load), the modulation control of the switching element of the power converter 100 will enter the hard switching mode. On the contrary, if the output power is greater than the reference power (in case of heavy load), the modulation control of the switching element of the power converter 100 will enter the phase shift modulation control mode, and the power converter 100 will be in the soft switching mode.

Figure 4:
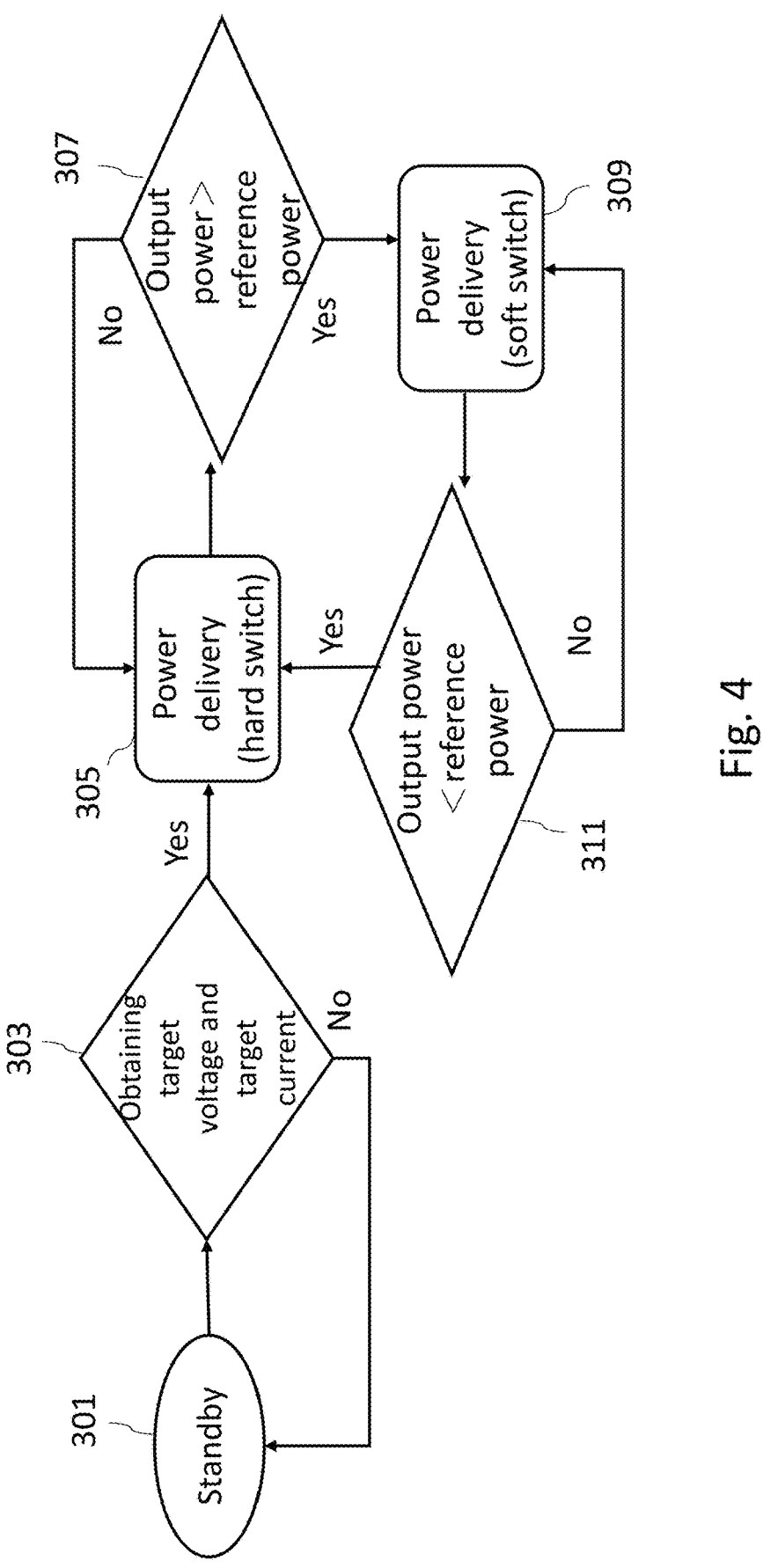
FIG. 4 illustrates a schematic diagram showing the flow of control method of a hard switching and a soft switching for phase shift pulse width modulation of a power converter according to another embodiment.
Figure 5:
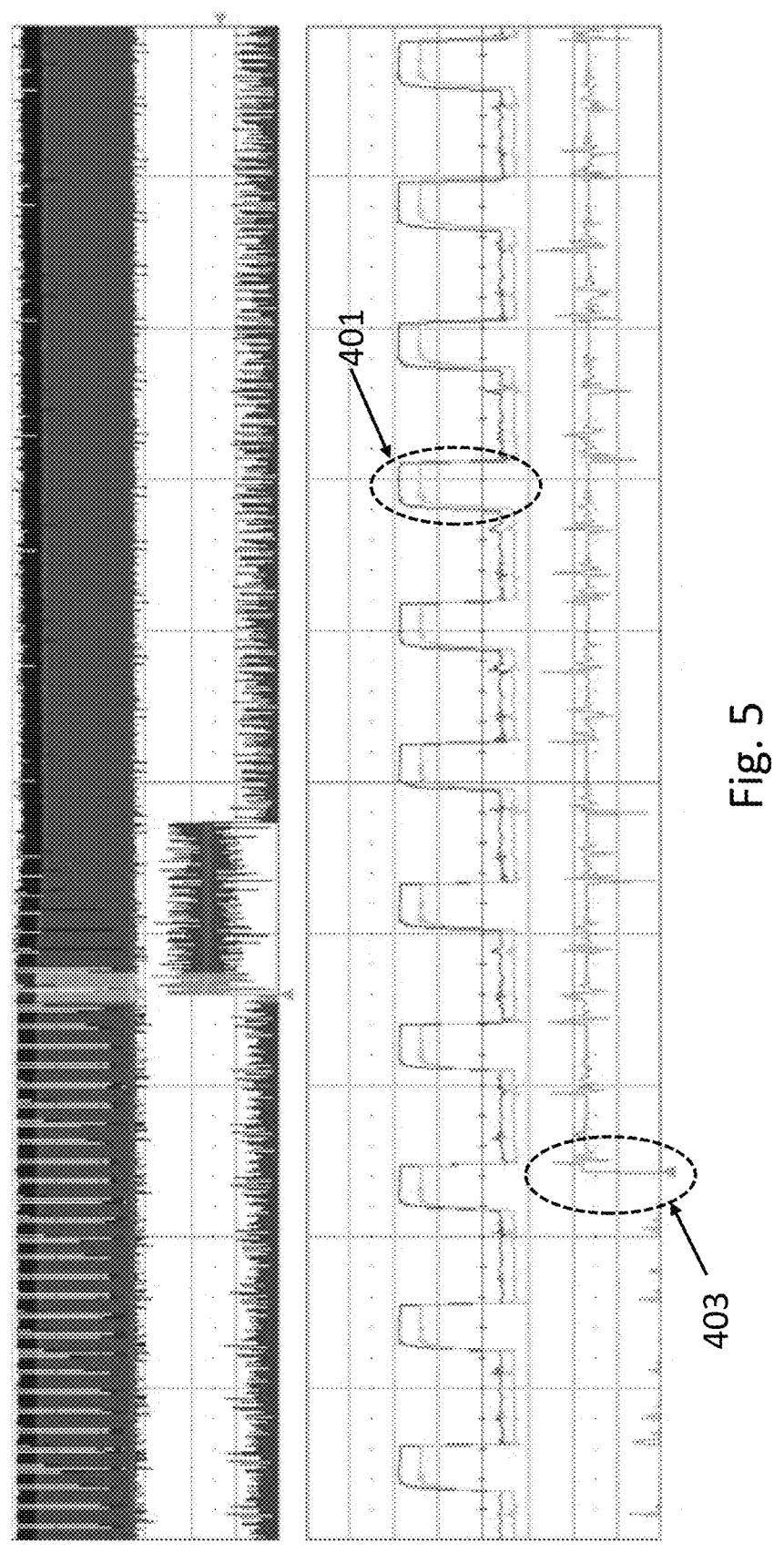
FIG. 5 shows waveforms of hard switching mode of the power converter.

As shown in FIG. 4, it is a schematic diagram showing the flow of control method of a hard switching and a soft switching for phase shift pulse width modulation of a power converter according to another embodiment. This method can be implemented by the full bridge power conversion system of FIG. 2. When the load state is standby 301, the operation of the power converter is in the standby switching mode, and the modulator component generates a pulse width modulation control signal, which is supplied to the driving element of the power converter for driving control. Subsequently, in the step 303, it is determined whether the target voltage and current are obtained. The load state detector 110 is used to determine whether the sampling signals of voltage and current reach the target voltage and current. If yes, proceed to the next step 305; if not, return to the standby 301 state and continue to sample the output voltage and current signals of the power converter. In the step 305, the output power (power delivery) of the power converter is obtained by the digital signal processor. In the step 305, the switching control of the switching element of the power converter is in the hard switching mode, as shown in FIG. 5. Referring to FIG. 5, in the hard switching mode, the gate driving signal 401 shows the gate driving signal waveforms of switching element $Q_2$ of the leading arm and switching element $Q_3$ of the trailing arm, and the modulation mode switching trigger signal 403 shows the modulation mode switching trigger signal of switching element $Q_4$ of the trailing arm.

Figure 6:
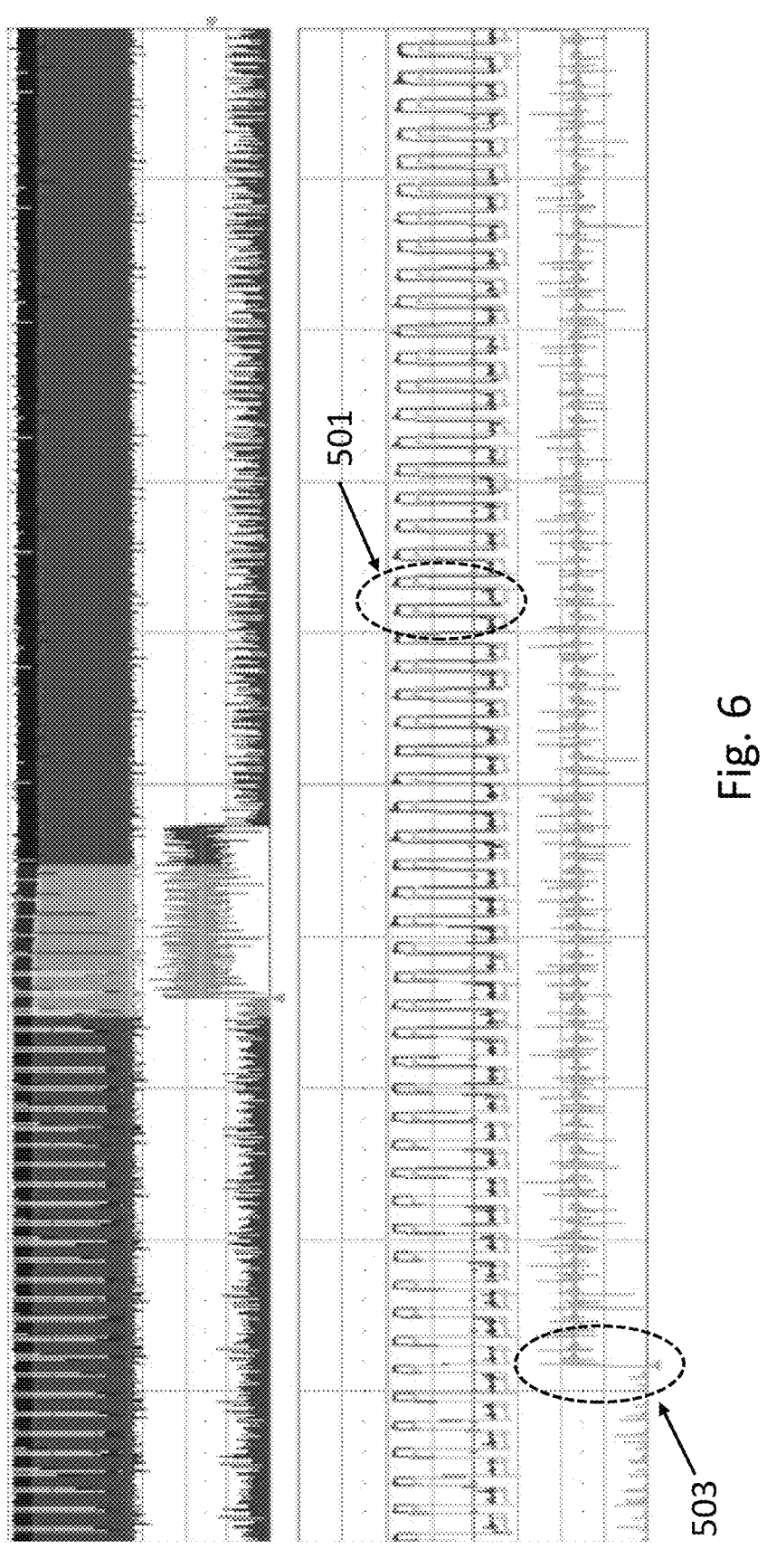
FIG. 6 shows waveforms of hard-soft switching transition mode of the power converter.
Figure 7:
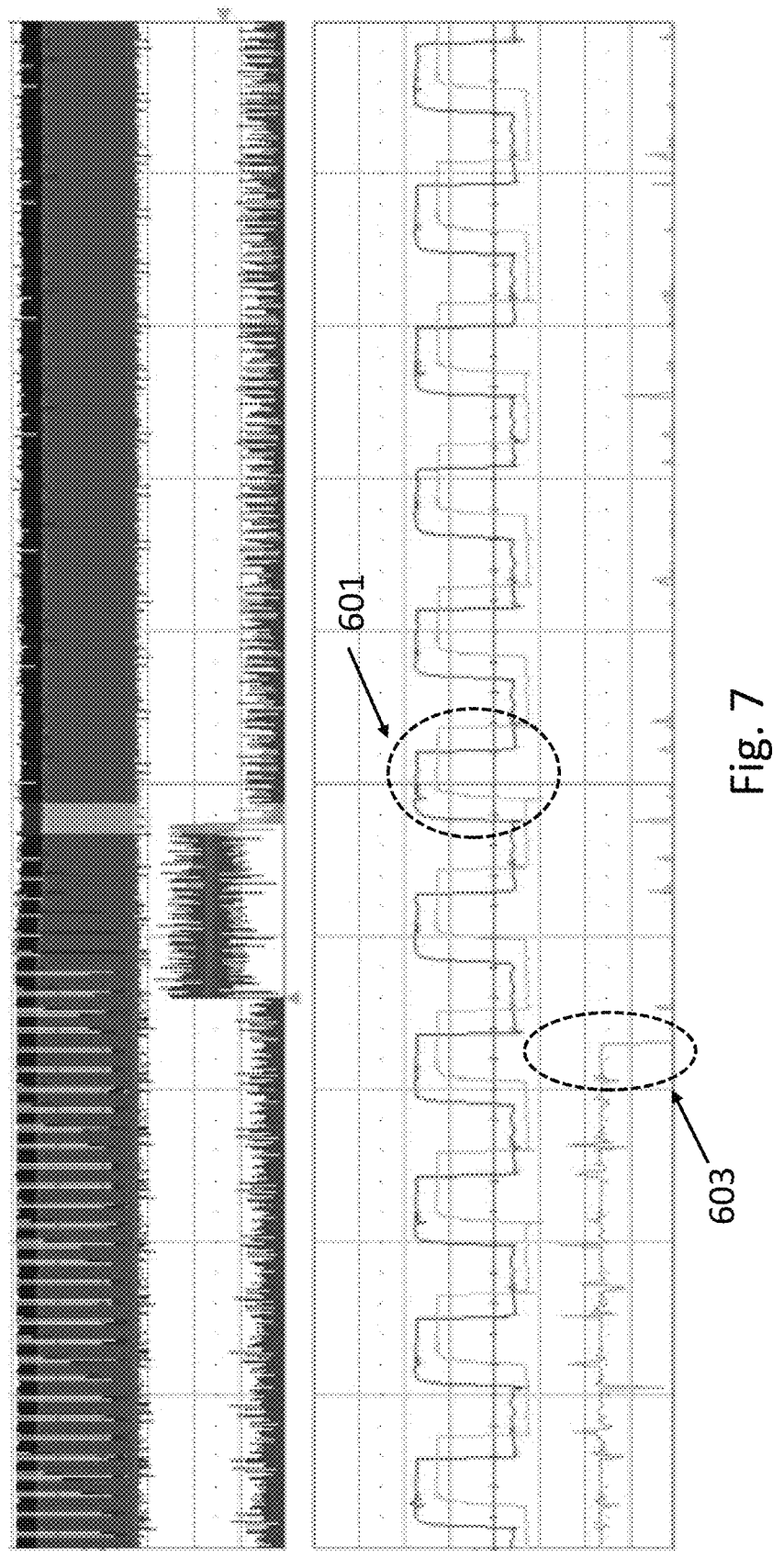
FIG. 7 shows waveforms of soft switching mode of the power converter.

Subsequently, in the step 307, it is determined whether the output power of the power converter is greater than the reference power. In this step, the output power of the power converter is compared with a reference power through a comparator to determine whether the output power of the power converter is greater than the reference power. If yes, proceed to the next step 309; if not, it returns to the hard switching mode of the step 305 and calculates the output power of the power converter. In the step 309, when the output power of the power converter is greater than the reference power (heavy load), the modulation control of the switching element of the power converter enters the phase shift modulation control mode, and then the power converter is in the soft switching mode, as shown in FIG. 7. Referring to FIG. 7, in the soft switching mode, the gate driving signal 601 shows the gate driving signal waveforms of switching element $Q_2$ of the leading arm and switching element $Q_3$ of the trailing arm, and the modulation mode switching trigger signal 603 shows the modulation mode switching trigger signal of switching element $Q_4$ of the trailing arm. During the transition from the hard switching mode to the soft switching mode, there is also a hard-soft switching transition mode, as shown in FIG. 6. Referring to FIG. 6, in the hard-soft switching transition mode, the gate drive signal 501 shows the gate drive signal waveforms of switch $Q_2$ of the leading arm and switch $Q_3$ of the trailing arm, and the modulation mode switching trigger signal 503 shows the modulation mode switching trigger signal of switch $Q_4$ of the trailing arm.

Subsequently, the step 311 is executed to determine whether the output power of the power converter is less than the reference power. In this step, the output power of the power converter is compared with a reference power through a comparator to determine whether the output power of the power converter is smaller than the reference power. If yes, the switching control of the switching element of the power converter enters the hard switching mode of the step 305; if not, the switching control of the switching element of the power converter enters the soft switching mode of the step 309. The above reference power is about 5 kW (Watt)

to 7 KW. The above data is only an example and is not intended to limit the present invention.

Figure 8:
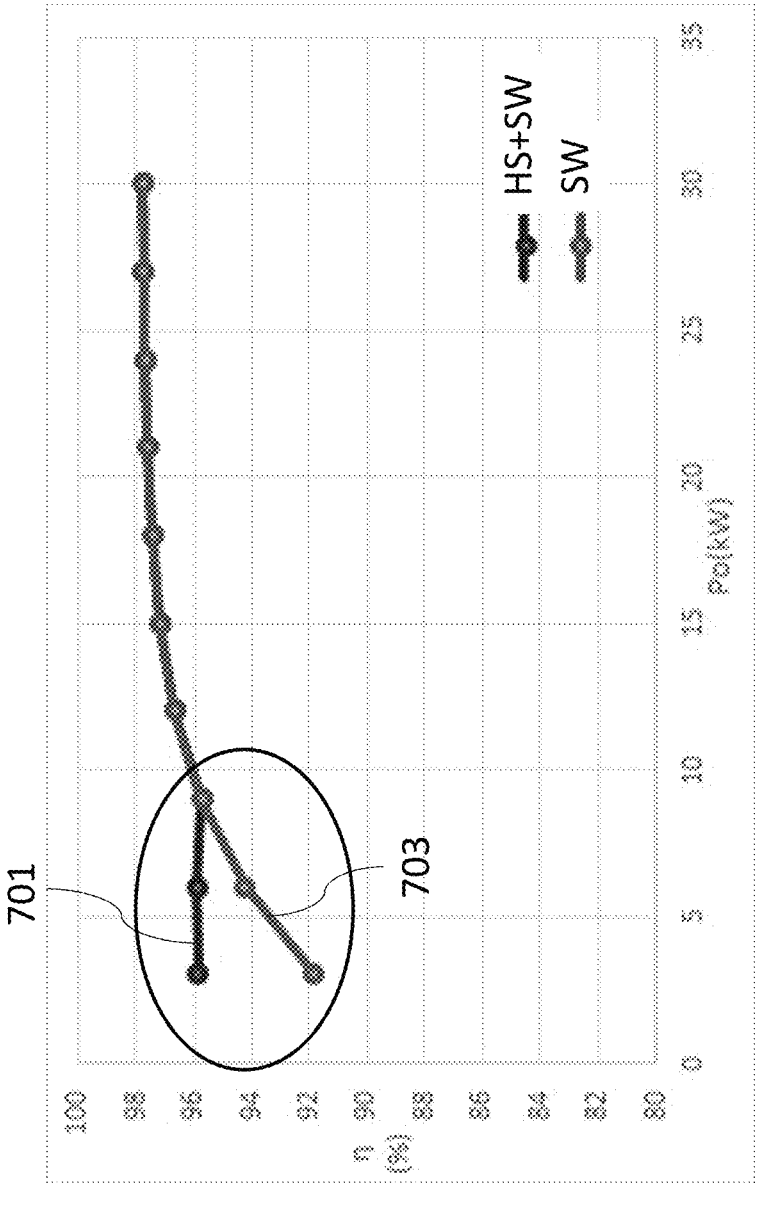
FIG. 8 illustrates an efficiency performance between hard-soft switching hybrid mode and soft switching mode according to an embodiment of the present invention.

When the power converter operates in the light load mode, the modulation control of the switch of the power converter will enter the hard switching mode. As shown in FIG. 8, when the output power of the power converter is less than 10 kW, it belongs to the light load mode, including a hard switching and a soft switching hybrid mode 701. It can be clearly seen from FIG. 8 that the efficiency performance under light load can be better than that of the conventional case with only the soft switching mode 703. In the method of the present invention, an efficiency value of about 96% can be obtained under light load, and the conventional full bridge phase shift modulation control method can only obtain an efficiency value of 92% or less.

In summary, when the load state is standby, the power converter operates in the standby mode, the modulator component will generate a pulse width modulation control signal and provide it to the driving element of the power converter. The controller obtains the difference value of the output power through the comparator, calculates the duty cycle parameter from the difference value, and inputs it to the modulator component to generate a modulation signal for driving control.

When the load is increased to the light load state, the power converter operates in the light load switching mode, and the modulation control of the switching element of the power converter will enter the hard switching mode. The modulator component generates a pulse width modulation control signal to the driving element of the power converter. In the stage of the hard switching, the power converter should not have entered zero voltage switching.

When the load is increased to the heavy load state, the power converter operates in the heavy load switching mode, the modulation control of the switching element of the power converter will enter the soft switching mode, and the modulator component generates a phase-shift modulation signal to the driving element of the power converter. Under heavy load, the primary side elements can achieve zero voltage switching, so the switching loss can be reduced and the efficiency of the power supply system can be improved. Efficiency is defined as the output power of the power converter divided by the input power of the power converter.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method of controlling phase shift pulse width modulation of a power converter, comprising:
obtaining output sampling signals of a power converter;
obtaining an output power of said power converter operated by a digital signal processor;
comparing said output power of said power converter with a reference power by a comparator;

providing a switching controller coupled to said power converter, a load state detector and a modulator component, wherein said switching controller judges a load state by a load parameter data, and controlling a switching element to make said power converter to change a mode of a hybrid mode comprising a hard switching mode and a soft switching mode;
if said output power is less than said reference power, a modulation control of said switching element of said power converter enters said hard switching mode;
if said output power is greater than said reference power, said modulation control of said switching element of said power converter enters said soft switching mode; and
wherein said modulation control of said power converter further comprises entering said hybrid mode comprising said hard switching mode and said soft switching mode when said power converter operating in a light load mode.

2. The method of claim 1, further comprising using said switching controller to operate said hard switching mode and said soft switching mode.

3. The method of claim 1, further comprising using a controller to calculate a duty cycle parameter according to a difference value outputted by said comparator.

4. The method of claim 3, further comprising using said modulator component to generate a pulse control signal and a phase shift modulation signal for driving and controlling said power converter.

5. The method of claim 4, wherein said modulator component includes a pulse width modulation signal generator and a phase shift modulation signal generator.

6. The method of claim 1, wherein said reference power is set by a reference power setting device.

7. The method of claim 1, wherein said power converter is a full-bridge resonant converter.

8. The method of claim 7, wherein said full-bridge resonant converter includes a full-bridge switching circuit.

9. The method of claim 8, wherein said full-bridge resonant converter further includes a resonant tank and a transformer.

10. The method of claim 9, wherein said full-bridge resonant converter further includes a rectifying and filtering circuit.

11. A method of controlling phase shift pulse width modulation of a power converter, comprising:
determining whether a sampled signal of a power converter reaches a target value by a load state detector;
obtaining an output power of said power converter operated by a digital signal processor;
providing a switching controller coupled to said power converter, said load state detector and a modulator component, wherein said switching controller judges a load state by a load parameter data, and controlling a switching element to make said power converter to change a mode of a hybrid mode comprising a hard switching mode and a soft switching mode;
comparing said output power of said power converter with a reference power by a comparator to determine whether said output power is greater than said reference power, if said output power is greater than said reference power, said power converter outputs power by said soft switching mode;
comparing said output power of said power converter with said reference power by said comparator to determine whether said output power is less than said reference power, if said output power is less than said reference power, said power converter outputs power by said hard switching mode; and wherein said power converter further comprises outputting said power by said hybrid mode comprising said hard switching mode and said soft switching mode when said power converter operating in a light load mode.

12. The method of claim 11, further comprising using said switching controller to operate said hard switching mode and said soft switching mode.

13. The method of claim 11, further comprising using a controller to calculate a duty cycle parameter according to a difference value outputted by said comparator.

14. The method of claim 13, further comprising using said modulator component to generate a pulse control signal and a phase shift modulation signal for driving and controlling said power converter.

15. The method of claim 14, wherein said modulator component includes a pulse width modulation signal generator and a phase shift modulation signal generator.

16. The method of claim 11, wherein said reference power is set by a reference power setting device.

17. The method of claim 11, wherein said power converter is a full-bridge resonant converter.

18. The method of claim 17, wherein said full-bridge resonant converter includes a full-bridge switching circuit.

19. The method of claim 18, wherein said full-bridge resonant converter further includes a resonant tank and a transformer.

20. The method of claim 19, wherein said full-bridge resonant converter further includes a rectifying and filtering circuit.

\* \* \* \* \*